United States Patent
Hasegawa et al.

(10) Patent No.: US 7,428,128 B2
(45) Date of Patent: Sep. 23, 2008

(54) HIGH READ OUTPUT, HIGH SENSITIVITY MAGNETIC SENSING ELEMENT

(75) Inventors: Naoya Hasegawa, Niigata-ken (JP); Masamichi Saito, Niigata-ken (JP)

(73) Assignee: TDK Corporation, Tokyo (JP)

( * ) Notice: Subject to any disclaimer, the term of this patent is extended or adjusted under 35 U.S.C. 154(b) by 469 days.

(21) Appl. No.: 10/755,416

(22) Filed: Jan. 12, 2004

(65) Prior Publication Data

US 2004/0252417 A1    Dec. 16, 2004

(30) Foreign Application Priority Data

Jan. 15, 2003    (JP) .............................. 2003-006625

(51) Int. Cl.
    *G11B 5/39* (2006.01)
    *H01L 43/00* (2006.01)
(52) U.S. Cl. .............. 360/324.11; 338/32 R; 324/207.21; 324/252
(58) Field of Classification Search ...... 360/324–324.2, 360/324.11, 324.12, 322, 326, 327, 327.3–327.33, 360/327.2, 327.22–327.24; 324/252, 207.21; 338/32 R
    See application file for complete search history.

(56) References Cited

U.S. PATENT DOCUMENTS

| | | | |
|---|---|---|---|
| 6,023,395 A | 2/2000 | Dill et al. | |
| 6,134,090 A | 10/2000 | Mao et al. | |
| 6,396,668 B1 | 5/2002 | Mao et al. | |
| 6,411,478 B1 | 6/2002 | Mao et al. | |
| 6,515,573 B1* | 2/2003 | Dong et al. | 338/32 R |
| 6,636,392 B2* | 10/2003 | Ito et al. | 360/324.1 |
| 6,671,139 B2* | 12/2003 | Carey et al. | 360/324.12 |
| 6,795,279 B2* | 9/2004 | Singleton et al. | 360/324.11 |
| 6,844,998 B2* | 1/2005 | Aoki et al. | 360/322 |
| 6,888,706 B2* | 5/2005 | Ooshima | 360/324.12 |
| 6,927,952 B2* | 8/2005 | Shimizu et al. | 360/324.12 |
| 7,019,948 B2* | 3/2006 | Shoji | 360/322 |
| 7,050,276 B2* | 5/2006 | Nishiyama | 360/324.11 |
| 2002/0012207 A1* | 1/2002 | Singleton et al. | 360/324.1 |
| 2002/0012209 A1* | 1/2002 | Ajiki et al. | 360/327.3 |
| 2002/0159201 A1* | 10/2002 | Li et al. | 360/324.1 |
| 2003/0214765 A1* | 11/2003 | Ghaly et al. | 360/324.12 |
| 2004/0061987 A1* | 4/2004 | Mauri et al. | 360/324.12 |
| 2004/0252417 A1* | 12/2004 | Haswgawa et al. | 360/324.11 |

\* cited by examiner

*Primary Examiner*—Brian E. Miller
*Assistant Examiner*—Matthew G Kayrish
(74) *Attorney, Agent, or Firm*—Brinks Hofer Gilson & Lione (57) ABSTRACT

A magnetic sensing element has pinned magnetic layers disposed on the two sides of a free magnetic layer in the track width direction with nonmagnetic conductive layers therebetween, and an electric current flows through these layers in parallel to the surfaces. The back end of the free magnetic layer in the track width direction extends in parallel to the track width direction. The back ends of the nonmagnetic conductive layers are coincident with the reference line drawn by extending the back end of the free magnetic layer. At least part of the back ends of the pinned magnetic layers is coincident with the reference line. Each pinned magnetic layer is shaped so that the region near the nonmagnetic conductive layer and the free magnetic layer has a smaller length in the height direction to achieve higher current density.

15 Claims, 8 Drawing Sheets

HIGH READ OUTPUT, HIGH SENSITIVITY MAGNETIC SENSING ELEMENT

This application claims the benefit of priority to Japanese Patent Application No. 2003-006625, herein incorporated by reference.

BACKGROUND OF THE INVENTION

1. Field of the Invention

The present invention relates to a magnetic sensing element in which pinned magnetic layers are disposed at the two sides of the free magnetic layer in the track width direction, in which electric current flows parallel to the surfaces of these layers. In particular, it relates to a magnetic sensing element having improved read outputs and superior sensitivity.

2. Description of the Related Art

A magnetic sensing element constituted from a composite including a free magnetic layer, a nonmagnetic conductive layer, a pinned magnetic layer, and an antiferromagnetic layer stacked in the film thickness direction, in which electric current flows perpendicular to the surface of each layer of the composite, is called current-perpendicular-to-the-plane (CPP) magnetic sensing element. Studies regarding CPP magnetic sensing elements have revealed that the area of the surface of the composite (hereinafter referred to as "element size") in a plan view must be decreased and the thickness of the composite must be increased in order to yield read outputs sufficient for practical application.

The extent to which the area of the surface of the composite can be decreased is limited according to the current photolithographic technology. Moreover, increasing the thickness of the composite results in an increase in the gap length, which results in degradation of the read characteristics.

Japanese Unexamined Patent Application Publication No. 200-319313, U.S. Pat. No. 6,396,668 B1, and U.S. Pat. No. 6,411,478 B1 disclose magnetic sensing elements in which free magnetic layers, nonmagnetic conductive layers, and pinned magnetic layers are juxtaposed in the track width direction and in which a current is supplied in a direction parallel to the surface of each layer.

The "chip size" and the "thickness" are differently defined between CPP magnetic sensing elements and the magnetic sensing elements described in the aforementioned publications. In the magnetic sensing elements disclosed in the above-described publications, "chip size" as defined in CPP magnetic sensing elements corresponds to the area of a longitudinal cross-section of a magnetic sensing element taken along the thickness direction. Moreover, the "thickness" as defined in CPP magnetic sensing elements corresponds to the length of the magnetic sensing element parallel to the surface of each layer.

Thus, the structure of the magnetic sensing elements disclosed in the above-described publications can easily achieve smaller "chip size" and larger "thickness" as defined in CPP magnetic sensing elements.

However, these publications do not sufficiently provide substantial means for putting these magnetic sensing elements into actual application. First of all, the publications do not identify the structure of a cross-section taken in a direction parallel to each layer of the magnetic sensing element. Since the structure of the cross-section taken parallel to the surface is an important factor for improving the read output, the structure of the cross-section must be investigated in order to put the magnetic sensing element into practical application.

Secondly, structures of the free magnetic layer and the pinned magnetic layer must be investigated in order to improve the read output and the sensitivity since the structures affect bulk scattering.

Thirdly, the means for controlling the magnetization of the free magnetic layer must also be investigated. None of the above-described publications provide sufficient disclosure regarding this point. Controlling the magnetization of the free magnetic layer is an important factor for practical application of the magnetic sensing element.

Japanese Unexamined Patent Application Publication No. 2001-319313 discloses a tunneling magnetoresistive element (TMR element) including a free magnetic layer, a pinned magnetic layer, and a nonmagnetic material layer (barrier layer) between the free magnetic layer and the pinned magnetic layer, in which the nonmagnetic material layer is composed of an insulating material such as $Al_2O_3$. In general, TMR elements already have high element resistance; hence, when the structure disclosed in this publication is employed, the resistance will further increase since the area of the cross-section taken in the direction of current flow is decreased, thereby making the practical application more difficult.

In view of the above, the inventors have employed copper to make the nonmagnetic material layer between the free magnetic layer and the pinned magnetic layer so as to make practicable magnetic sensing elements.

SUMMARY OF THE INVENTION

The present invention aims to overcome the above-described problems of the conventional art. An object of the present invention is to provide a practicable high read output, high sensitivity magnetic sensing element having pinned magnetic layer arranged at the two sides of a free magnetic layer in the track width direction, in which an electric current flows through these layers.

To achieve this object, a first aspect of the present invention provides a magnetic sensing element including a composite that includes a free magnetic layer; two nonmagnetic conductive layers disposed at the two sides of the free magnetic layer; two pinned magnetic layers disposed at the two sides of the free magnetic layer with the nonmagnetic conductive layers therebetween; and two antiferromagnetic layers disposed on the pinned magnetic layers. An electric current flows through the free magnetic layer via the pinned magnetic layers and the nonmagnetic conductive layers. In a cross-section of the free magnetic layer, the nonmagnetic conductive layers, and the pinned magnetic layers, the cross-section being taken in a direction parallel to the surface of each layer, a back end of the free magnetic layer extends parallel to a track width direction, back ends of the nonmagnetic conductive layers are coincident with an extension line drawn by extending the back end of the free magnetic layer, and back ends of the pinned magnetic layers are at least partly coincident with the extension line.

Preferably, in the cross-section, the back end of each pinned magnetic layer has a first portion coincident with the extension line and a second portion that extends in a height direction from the extension line, and the length of each pinned magnetic layer from a face opposing a recording medium to the back end in the height direction is smaller in a region near the nonmagnetic conductive layers and the free magnetic layer.

Alternatively, the entire back end of each pinned magnetic layer is coincident with the extension line.

A second aspect of the present invention provides a magnetic sensing element including a composite that includes a free magnetic layer; two nonmagnetic conductive layers disposed at the two sides of the free magnetic layer; two pinned magnetic layers disposed at the two sides of the free magnetic layer with the nonmagnetic conductive layers therebetween; and two antiferromagnetic layers disposed on the pinned magnetic layers. An electric current flows through the free magnetic layer via the pinned magnetic layers and the nonmagnetic conductive layers. In a cross-section of the free magnetic layer, the nonmagnetic conductive layers, and the pinned magnetic layers, the cross-section being taken in a direction parallel to the surface of each layer, a back end of the free magnetic layer, back ends of the nonmagnetic conductive layers, and back ends of the pinned magnetic layers form a continuous curve gradually receding in a height direction, and the length of each pinned magnetic layer from a face opposing a recording medium to the back end in the height direction is gradually reduced toward the free magnetic layer.

In each of the magnetic sensing elements described above the regions of the pinned magnetic layers near the free magnetic layer are narrowed to increase the current density. According to this structure, read output can be improved.

Preferably, the magnetic sensing element further includes at least one backing layer disposed between the free magnetic layer and said at least one specular layer.

More preferably, the magnetic sensing element further includes at least one specular layer disposed under and/or inside each pinned magnetic layer.

According to the structure in which the specular layer is formed under the free magnetic layer and/or the pinned magnetic layers, conduction electrons having a spin with a longer mean free path (majority electrons), e.g., spin-up conduction electrons, undergo diffusive scattering at the top face or the bottom face of the free magnetic layer if the thickness of the free magnetic layer is excessively small. This results in shorter spin diffusion lengths and degradation of the change in resistance $\Delta R$. Thus, the thickness of the free magnetic layer is sufficiently large. However, at an excessively large thickness, the magnetic moment of the free magnetic layer per unit area (hereinafter, simply referred to as "Ms·t", since the magnetic moment is the product of the saturation magnetization Ms and the thickness t) becomes excessively large, and the read sensitivity is degraded as a result. By providing the specular layer, the spin diffusion length can be extended without excessively increasing the thickness of the free magnetic layer, and a magnetic sensing element having superior MR characteristics can be obtained. Moreover, the thickness of the pinned magnetic layers does not have to be large when the specular layers are provided. Thus, an exchange coupling magnetic field of an appropriate intensity can be generated between the pinned magnetic layers and the antiferromagnetic layers.

Preferably, in the present invention, the free magnetic layer is constituted from a plurality of magnetic sublayers and conductive nonmagnetic interlayers alternately stacked on each other, and the magnetization directions of all of the magnetic sublayers are oriented in the same direction.

More preferably, the pinned magnetic layers and the plurality of magnetic sublayers of the free magnetic layer are composed of a material that yields a positive spin-dependant bulk scattering coefficient $\beta$, and the nonmagnetic conductive layers and the nonmagnetic interlayers are composed of a material that yields positive spin-dependent interfacial scattering coefficients $\gamma$ at the interfaces between the pinned magnetic layers and the nonmagnetic conductive layers, between the nonmagnetic conductive layers and the free magnetic layer, and between the magnetic sublayers and the conductive nonmagnetic interlayers.

In the present invention, each pinned magnetic layer may be constituted from a plurality of magnetic sublayers and conductive nonmagnetic interlayers alternately stacked on each other, and the magnetization directions of all of the magnetic sublayers are pinned in the same direction.

Preferably, the plurality of magnetic sublayers of the each pinned magnetic layer and the free magnetic layer are composed of a material that yields a positive spin-dependant bulk scattering coefficient $\beta$, and the nonmagnetic conductive layers and the nonmagnetic interlayers are composed of a material that yields positive spin-dependent interfacial scattering coefficients $\gamma$ at the interfaces between the pinned magnetic layers and the nonmagnetic conductive layers, between the nonmagnetic conductive layers and the free magnetic layer, and between the magnetic sublayers and the conductive nonmagnetic interlayers.

The thickness of the free magnetic layer must be sufficiently large; however, at an excessively large thickness, an increase in Ms·T of the free magnetic layer degrades the sensitivity to magnetic fields form magnetic recording media.

In order to overcome this problem, the free magnetic layer is provided as a composite of magnetic sublayers and nonmagnetic interlayers, and the magnetization directions of all of the magnetic sublayers are oriented in the same direction. When the free magnetic layer has such a multilayer structure, the specular layer may or may not be used. In this manner, conduction electrons having a spin with a shorter mean free path, e.g., spin-down conduction electrons, can be easily scattered at the interfaces between the magnetic sublayers and the nonmagnetic interlayers (the spin filtering effect). Meanwhile, conduction electrons having a spin with a longer mean free path, e.g., spin-up conduction electrons (majority electrons), are not scattered inside the free magnetic layer or at the interfaces between the nonmagnetic interlayers and the magnetic sublayers. As a result, the same advantage as those achieved by increasing the thickness of the free magnetic layer, i.e., extended spin diffusion length, can be achieved. Moreover, the difference in the mean free path between the conduction electrons having a spin with a longer mean free path and those with a shorter mean free path can be widened. As a result, the change in resistance $\Delta R$ can be increased, and the read output can be improved.

Furthermore, when the free magnetic layer has the multilayer structure, the thickness of the free magnetic layer can be increased while decreasing the volume ratio of the magnetic sublayers to the entire volume of the free magnetic layer. In this manner, the effective Ms·t can be decreased, and the read sensitivity can be improved. The magnetic sublayers are ferromagnetically coupled with each other through RKKY coupling, direct exchange coupling via pinholes, or topological coupling, so that the multilayer structure as a whole can behave as if it is an integral ferromagnetic member.

In order to effectively produce spin filtering effect and to extend of the spin diffusive length of the majority electrons in the multilayered structure, the spin-dependant bulk scattering coefficient $\beta$ and the spin-dependent interfacial scattering coefficient $\gamma$ must be optimized by, for example, making appropriate selections of materials for making these layers.

Preferably, the material that yields a positive spin-dependant bulk scattering coefficient $\beta$ is one of a NiX alloy, a CoT alloy, an FeZ alloy, or a Co—Mn-D alloy, wherein X is at least one selected from the group consisting of Co, Fe, Mn, Zr, Hf, Cu, and Au, T is at least one selected from the group consisting of Fe, Zr, Ta, and Hf, Z is at least one selected from the group consisting of Ni, Co, Rh, Pt, Ir, Be, Al, Si, Ga, and Ge, and D is at least one selected from the group consisting of Al, Ga, Si, Ge, and Sn. Preferably, the material that yields positive spin-dependent interfacial scattering coefficients γ is Cu.

A third aspect of the present invention provides a magnetic sensing element including a composite that includes a free magnetic layer; nonmagnetic conductive layers; and pinned magnetic layers, in which an antiferromagnetic layer is provided above or under the free magnetic layer so as to control the magnetization direction of the free magnetic layer. In this embodiment, antiferromagnetic layers for pinning the magnetization directions of the pinned magnetic layers are no longer necessary. Moreover, the distance between the free magnetic layer and the antiferromagnetic layer for controlling the magnetization direction of the free magnetic layer can be easily optimized. Thus, the free magnetic layer can be easily put to a single-magnetic-domain state.

DESCRIPTION OF THE PREFERRED EMBODIMENTS

Figure 1:
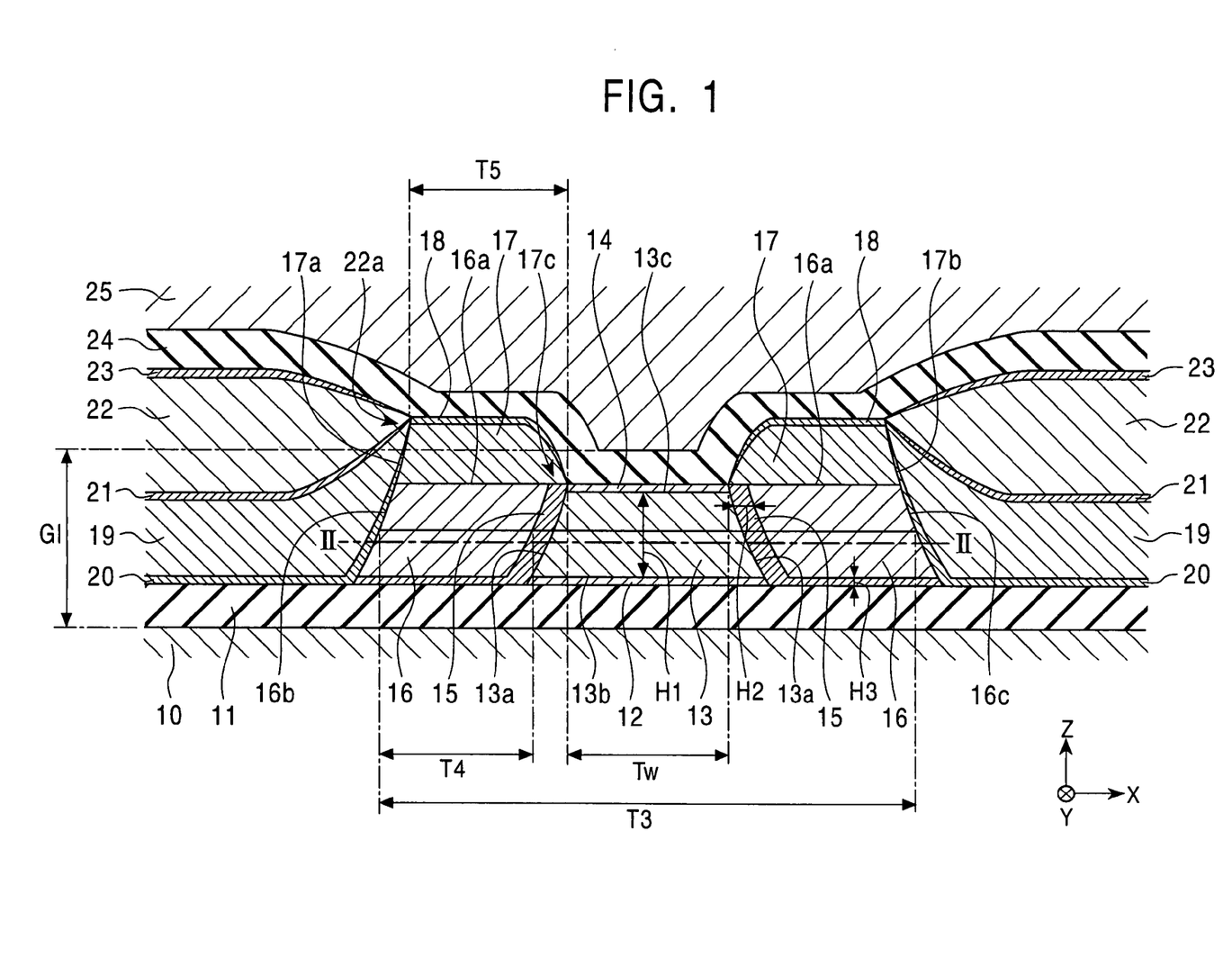
FIG. 1 is a cross-sectional view of a magnetic sensing element according to an embodiment of the present invention taken in a direction parallel to the opposing face.

FIG. 1 is a cross-sectional view of a magnetic sensing element according to a first embodiment of the present invention viewed from a face of the magnetic sensing element opposing a recording medium (hereinafter, this face is referred to as the "opposing face"). The cross-sectional view is taken parallel to the opposing face.

The magnetic sensing element shown in FIG. 1 is a giant magnetoresistive (GMR) head for reading an external signal recorded on a recording medium. An inductive writing head may be disposed on the magnetic sensing element, although this is not shown in the drawing.

In the following description, surfaces of the layers constituting the magnetic sensing element lie in the X-Y plane as defined in each of the drawings. The term "track width direction" refers to a direction parallel to the X direction. The width of a region having magnetization that changes in response to an external magnetic field coincides with this "track width direction". For example, when no external magnetic field is applied, the free magnetic layer is magnetized in the track width direction. The term "height direction" refers to a direction parallel to the Y direction in the drawing. A leakage magnetic field from a recording medium is applied in the height direction. The Z direction in the drawing indicates the moving direction of the recording medium.

When the magnetic sensing element is applied to a magnetic head, the "face opposing a recording medium (opposing face)" corresponds to a so-called air-bearing surface (ABS).

The magnetic sensing element shown in FIG. 1 is formed on, for example, a trailing end face of a slider made of alumina titanium carbide ($Al_2O_3$—TiC). The face of the slider remote from the recording medium is attached to a resilient support member composed of, for example, stainless steel, so as to form a magnetic head.

Referring to FIG. 1, a lower shield layer 10 is composed of a magnetic material such as a NiFe alloy. A lower gap layer 11, composed of $Al_2O_3$ or $SiO_2$, is formed on the lower shield layer 10.

As shown in FIG. 1, a seed layer 12 is formed on the center portion of the lower gap layer 11 in the drawing. The seed layer 12 is composed of, for example, Ta, a NiFe alloy, a NiFeCr alloy, or Cr. The seed layer 12 improves the crystallinity of a free magnetic layer 13 formed on the seed layer 12. In particular, the grain diameter of the crystals can be increased in a direction parallel to the layer surface, or {111} faces of crystals can be preferentially oriented in a direction parallel to the layer surface. As a result, improvement sin current carrying reliability, i.e., typically, improvement of resistance to electromigration, and in rate of change in resistance ($\Delta R/R$) can be achieved. The thickness of the seed layer 12 is, for example, approximately 60 Å.

A free magnetic layer 13 composed of a soft magnetic material is formed on the seed layer 12. The free magnetic layer 13 may be a single layer composed of a NiFe alloy, a CoFe alloy, a CoFeNi alloy, or the like, or may be a laminate of magnetic sublayers composed of these magnetic materials.

As shown in FIG. 1, two side faces 13a of the free magnetic layer 13 in the track width direction (the X direction) are formed as slopes such that the width of the free magnetic layer 13 in the track width direction gradually decreases from a bottom face 13b to a top face 13c. The sloped side faces 13a may be flat or curved. The cross-section of the free magnetic layer 13 taken in a direction parallel to the X-Z plane of the drawing is thus substantially trapezoidal.

A specular layer (sometimes referred to as "mirror reflection layer") 14 is formed on the top face 13c of the free magnetic layer 13. The specular layer 14 is, for example, an oxidized Ta layer. As shown in FIG. 1, the two side faces of the seed layer 12, the two side faces of the free magnetic layer 13, and the two side faces the specular layer 14 in the track width direction form two continuous slopes. Each slope may be flat or curved. The flat or curved slopes are formed by etching.

As shown in FIG. 1, nonmagnetic conductive layers 15 composed of a nonmagnetic conductive material such as Cu are formed on the side faces 13a of the free magnetic layer 13, the two side faces of the seed layer 12, and the two side faces of the specular layer 14. The nonmagnetic conductive layers 15 are extended to cover portions of the lower gap layer 11 not overlaid by the free magnetic layer 13. The thickness H2 of the nonmagnetic conductive layer 15 in the track width direction on the lower gap layer side face 13a is larger than the thickness H3 of the nonmagnetic conductive layer 15 formed on the lower gap layer 11. This structure reduces the amount or sensing current shunting to the nonmagnetic conductive layers 15 formed on the lower gap layer 11. The thicknesses H2 and H3 can be adjusted by controlling the angle of deposition in the step of forming the nonmagnetic conductive layers 15.

Pinned magnetic layers 16 composed of a soft magnetic material such as a NiFe alloy, a CoFe alloy, or a CoFeNi alloy are formed on the nonmagnetic conductive layers 15. Each pinned magnetic layer 16 may be a magnetic single layer or may be a laminate including a number of sublayers. Preferably, the pinned magnetic layers 16 are composed of a Co-based magnetic material in order to increase the exchange coupling magnetic field Hex generated between the pinned magnetic layers 16 and antiferromagnetic layers 17 formed on the pinned magnetic layers 16. Preferably, the interface between the pinned magnetic layer 16 and the antiferromagnetic layer 17 at least includes a magnetic region composed of a Co-based magnetic material.

In FIG. 1, the top face of the specular layer 14 and top faces 16a of the pinned magnetic layers 16 are flush with one another and thus form a flat surface. Alternatively, the level of the top faces 16a may be higher or lower than that of the top face of the specular layer 14. In such a case, differences between the top faces should be as small as possible in order to improve the magnetoresistive properties. In particular, the differences between the top faces are preferably within ±100 Å with respect to the top face of the specular layer 14.

As shown in FIG. 1, the antiferromagnetic layers 17 are formed on the top faces 16a of the pinned magnetic layers 16. Hereinafter the antiferromagnetic layers 17 are referred to as "first antiferromagnetic layers 17". Preferably, the first antiferromagnetic layers 17 are composed of a PtMn alloy, an X—Mn alloy, or a Pt—Mn—X' alloy, wherein X is at least one element selected from the group consisting of Pd, Ir, Rh, Ru, and Os, and X' is at least one element selected from the group consisting of Pd, Ir, Rh, Ru, Au, Ag, Os, Cr, Ni, Ar, Ne, Xe, and Kr.

The pinned magnetic layers 16 and the first antiferromagnetic layers 17 are continuously deposited in the same chamber without being exposed to air. Upon completion of the deposition, the first antiferromagnetic layers 17 and the pinned magnetic layers 16 are annealed in a magnetic field to generate an exchange coupling magnetic field (Hex) therebetween and to pin the magnetization direction of the pinned magnetic layers 16 in the height direction (the Y direction).

As shown in FIG. 1, protective layers 18 composed of Ta or the like are formed on the first antiferromagnetic layers 17.

A left side face 16b of the pinned magnetic layer 16 disposed at the left side of the free magnetic layer 13 and a left side face 17a of the first antiferromagnetic layer 17 disposed at the left side of the free magnetic layer 13 form a continuous sloped face. The sloped face may be flat or curved. A right side face 16c of the pinned magnetic layer 16 disposed at the right side of the free magnetic layer 13 and a right side face 17b of the first antiferromagnetic layer 17 disposed at the right side of the free magnetic layer 13 form a continuous sloped face. The sloped face may be flat or curved.

As shown in FIG. 1, hard bias layers 19 are formed on the left side faces 16b and 17a and on the right side faces 16c and 17b of the pinned magnetic layer 16 and the first antiferromagnetic layer 17. The hard bias layers 19 are composed of a hard magnetic material such as a CoPt alloy or a CoPtCr alloy.

Bias underlayers 20 composed of Cr or the like are formed beneath the hard bias layers 19. The bias underlayers 20 extend over the side faces 16b, 16c, 17a, and 17b of the pinned magnetic layers 16 and the first antiferromagnetic layers 17. The bias underlayers 20 improve the properties, i.e., the coercive force Hc and the remanence ratio S, of the hard bias layers 19.

As shown in FIG. 1, a spacer layer 21 composed a nonmagnetic material such as Ta or Cr is formed on each hard bias layer 19. An electrode layer 22 is formed on each spacer layer 21. The electrode layers 22 are composed of Au, Cr or the like. The electrode layer 22 may extend over the first antiferromagnetic layers 17. However, when the electrode layers 22 completely cover the first antiferromagnetic layers 17, electric current from the electrode layers 22 will be partly lost as a result of shunting, thereby decreasing the read output. Thus, an inner tip 22a of the electrode layer 22 is preferably located some distance remote from an inner tip 17c of the first antiferromagnetic layer 17 in the direction opposite to the X direction. In particular, the distance T5 between the inner tip 22a of the electrode layer 22 and the inner tip 17c of the first antiferromagnetic layer 17 is preferably at least 0.05 to 0.1 µm.

A protective layer 23 composed of Ta or the like is formed on each electrode layer 22.

As shown in FIG. 1, an upper gap layer 24 composed of $Al_2O_3$, $SiO_2$, or the like is formed over the protective layers 18, the protective layers 23, and the specular layer 14. An upper shield layer 25 composed of a magnetic material is formed on the upper gap layer 24.

Figure 2:
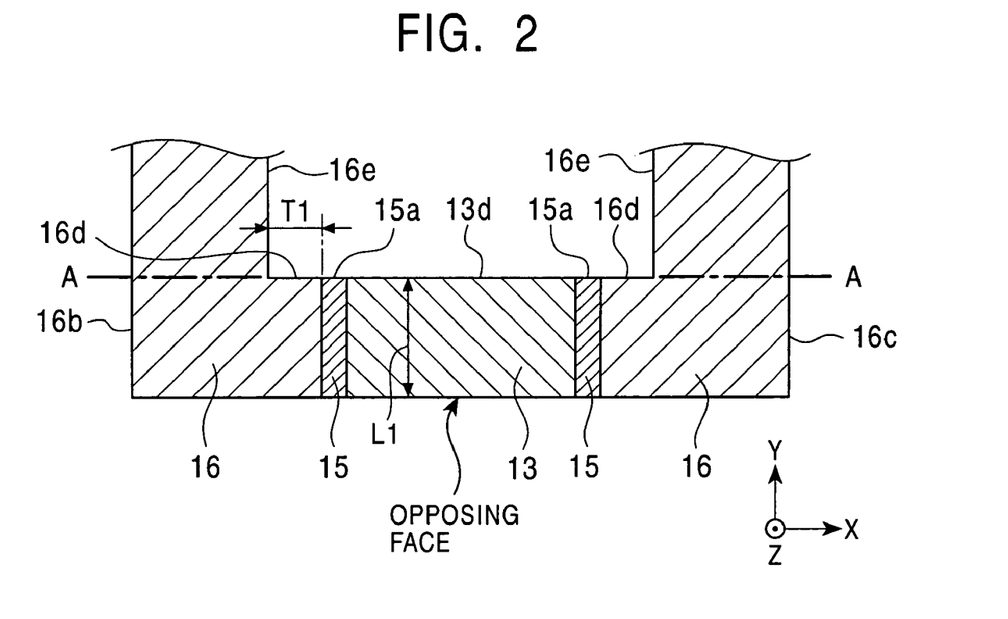
FIG. 2 is a partial cross-sectional plan view of a free magnetic layer, nonmagnetic conductive layers, and pinned magnetic layers of the magnetic sensing element shown in FIG. 1 cut along line II-II parallel to the X-Y plane of the drawing.

FIG. 2 is a partial cross-sectional view of the free magnetic layer 13, the nonmagnetic conductive layers 15, and the pinned magnetic layers 16 taken along line II-II parallel to the X-Y plane in FIG. 1.

As shown in FIG. 2, a back end 13d of the free magnetic layer 13 extends in a direction parallel to the track width direction (the X direction). The outline of the back end 13d of the free magnetic layer 13 is defined as the reference line A-A. Back ends 15a of the nonmagnetic conductive layers 15 and back ends 16d of the pinned magnetic layers 16 are aligned on the line A-A. Each pinned magnetic layer 16 has a bent portion 16e that extends in the height direction (Y direction) from the back end 16d.

According to this structure, the length of the pinned magnetic layer 16 from the opposing face in the height direction (Y direction) is reduced in the region in which the pinned magnetic layers 16 come into contact with the free magnetic layer 13 with the nonmagnetic conductive layers 15 therebetween. Thus, the current density is effectively increased in this region.

The length L1 of the free magnetic layer 13 from the opposing face to the back end 13d is preferably in the range of 0.05 to 0.15 µm. The element size can be reduced by controlling the length L1 within the above-described range. Here, the "element size" refers to the area of a X-Z cross-section of the element. As a result, a magnetic sensing element having superior read output can be manufactured.

Preferably, the length T1 of the back end 16d of the pinned magnetic layer 16 in the track width direction (the X direction), i.e., along the line A-A, is in the range of 50 to 1,000 Å. In this manner, the regions of the pinned magnetic layers 16 near the free magnetic layer 13 can be sufficiently narrowed to effectively increase the current density and to improve the read output.

The X-Y cross-section of the free magnetic layer 13 and the pinned magnetic layers 16 is not limited to that shown in FIG. 2. The structure shown in FIG. 3 or 4 may also be employed.

Figure 3:
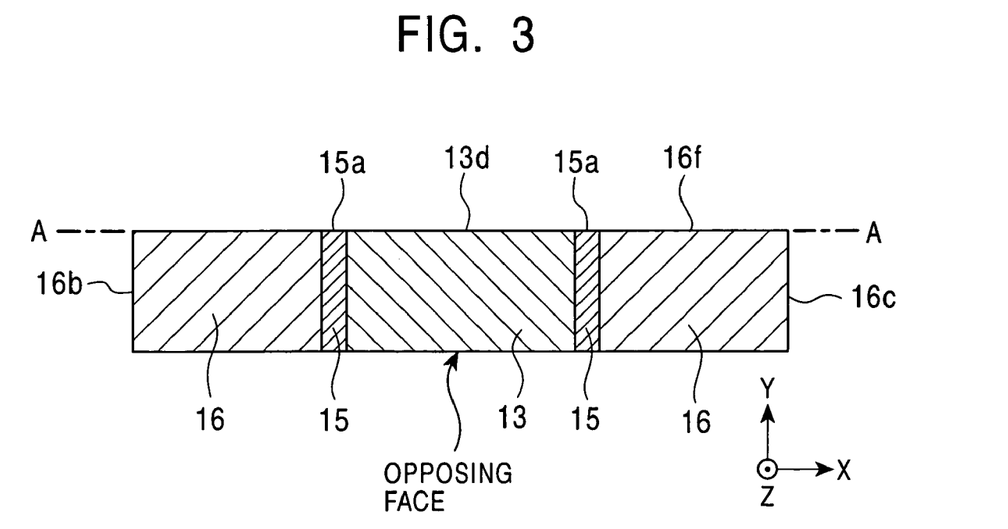
FIG. 3 is a partial cross-sectional plan view of the free magnetic layer, the nonmagnetic conductive layers, and the pinned magnetic layers according to another example.

In FIG. 3, each pinned magnetic layer 16 has a back end 16f coincident with the reference line A-A.

Figure 4:
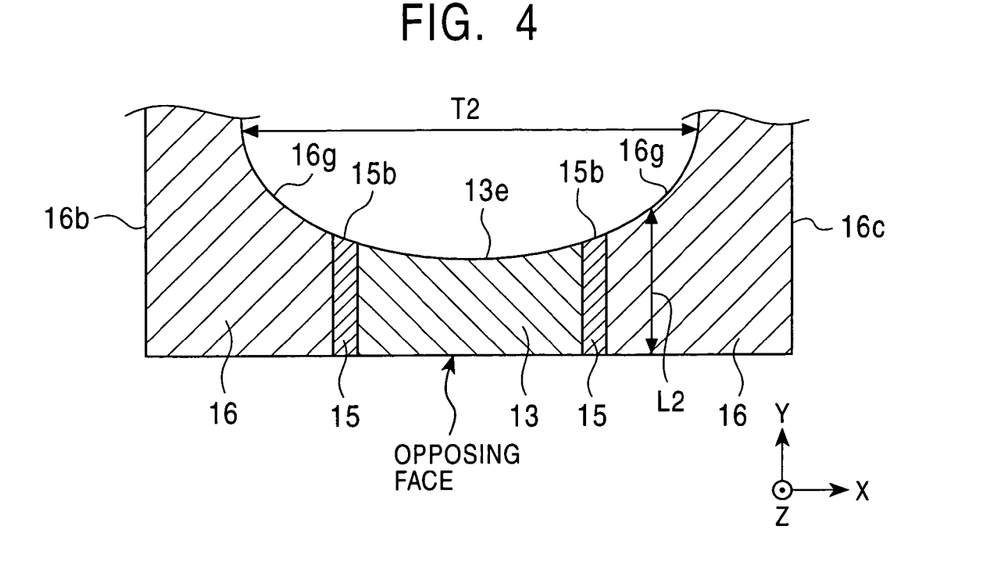
FIG. 4 is a partial cross-sectional plan view of the free magnetic layer, the nonmagnetic conductive layers, and the pinned magnetic layers according to yet another example.

In FIG. 4, a back end 13e of the free magnetic layer 13, back ends 15b of the nonmagnetic conductive layer 15, and back ends 16g of the pinned magnetic layer 16 form a curved line gradually receding towards the height direction (Y direction). As a result, the length L2 of each pinned magnetic layer 16 from the opposing face in the height direction gradually decreases toward the free magnetic layer 13.

The curved line shown in FIG. 4 is frequently formed in the following instances. When each of the layers shown is deposited to have a significantly small width in the track width direction, the maximum distance T2 between the back end 16g of the pinned magnetic layer 16 at the left side and the back end 16g of the pinned magnetic layer 16 at the right side must also be small, i.e., approximately 0.1 to 0.5 µm. In order to do so, the photoresist for defining the shape of the back ends 13e, 15b, and 16g inevitably become rounded, thereby yielding the curved shape shown in FIG. 4.

Since the magnetic sensing element shown in FIG. 1 includes one of the structures shown in FIGS. 2 to 4, the density of the current flowing from the pinned magnetic layers 16 to the free magnetic layer 13 can be increased, and the read output can be improved. Moreover, since the seed layer 12 between the top face 13c of the free magnetic layer 13 and the lower gap layer 11, and the specular layer 14 between the top face 13c of the free magnetic layer 13 and the upper gap layer 24 have significantly small thickness, the gap length G1 can be reduced, and a magnetic sensing element having the optimum recording density can be produced.

In the magnetic sensing element shown in FIG. 1, the current supplied from the electrode layer 22 flows in the X direction through the pinned magnetic layer 16, the nonmagnetic conductive layer 15, and the free magnetic layer 13. Accordingly, the current flow is the same as that of the CPP magnetic sensing element. However, since the free magnetic layer 13, the nonmagnetic conductive layer 15, and the pinned magnetic layer 16 are aligned in the track width direction, the element size (the face parallel to the X-Z plane) can be decreased, and the total width T3 of the pinned magnetic layers 16, the nonmagnetic conductive layers 15, and the free magnetic layer 13 in the track width direction can be increased to approximately 0.1 to 0.2 µm. Here, the width is taken at the midpoint of the thickness of the free magnetic layer 13. Moreover, since the magnetic sensing element includes one of the structures shown in FIGS. 2 to 4, the rate of change in resistance (ΔR) can be effectively improved, and a practicable magnetic sensing element having high read output can be manufactured.

The magnetic sensing element, which has the pinned magnetic layers 16 at the two sides of the free magnetic layer 13, shown in FIG. 1 is of a dual spin-valve type. When compared with a single spin-valve thin film element having one free magnetic layer and one pinned magnetic layer, the read output can be improved.

In order to align the free magnetic layer 13, the nonmagnetic conductive layers 15, and the pinned magnetic layers 16 in the track width direction, as shown in FIG. 1, the free magnetic layer 13 is first formed and etched to have a substantially trapezoidal shape, followed by the deposition of the nonmagnetic conductive layers 15 and the pinned magnetic layers 16. Thus, these layers are not formed continuously. However, the GMR effect of the magnetic sensing element shown in FIG. 1 largely depends on the spin-dependant bulk scattering inside the magnetic material rather than the spin-dependent scattering at the interfaces. Thus, the discontinuity of these layers and the presence of moderate degree of contamination and milling damage at the interfaces do not pose serious threat to the MR characteristics. Thus, a practicable magnetic sensing element shown in FIG. 1 can be easily and appropriately manufactured.

The total width T3 of the pinned magnetic layers 16, the nonmagnetic conductive layers 15, and the free magnetic layer 13 can only be increased within the above-described range. When the total width T3 exceeds this range, conduction electrons having spins with a longer mean free path, i.e., majority electrons, will undergo diffusive scattering before they pass through the free magnetic layer 13. Majority electrons are, for example, conduction electrons having up spins. Hereinafter, the conduction electrons having spins with a longer mean free path are referred to as "spin-up electrons", and those having spins with a shorter mean free path are referred to as "spin-down electrons". Accordingly, the total width T3 must be optimized within the above-described range, and the track width Tw defined by the width of the top face 13c of the free magnetic layer 13 in the X direction must not be excessively long. The track width Tw is preferably within the range of 0.01 to 0.1 µm.

The element size of the magnetic sensing element shown in FIG. 1 can be reduced by decreasing the thickness H1 of the free magnetic layer 13, as described above. However, when the thickness H1 is excessively small, the spin-up conduction electrons collide with the bottom face 13b or the top face 13c of the free magnetic layer 13 too rapidly, thereby causing diffusive scattering. The thickness H1 of the free magnetic layer 13 is preferably at least 30 Å, and more preferably at least 50 Å. On the other hand, the magnetic moment per unit area of the free magnetic layer 13 increases and the sensitivity is degraded when the thickness H1 of the free magnetic layer 13 is excessively large. Accordingly, in order to put the magnetic sensing element shown in FIG. 1 into practical application, the structure of the free magnetic layer 13 must also be studied. Note that hereinafter the magnetic moment per unit area is simply referred to as "Ms·t", since the magnetic moment per unit area is the product of the saturation magnetization Ms and the thickness t.

In view of the above, the specular layer 14 is formed on the top face 13c of the free magnetic layer 13 in the embodiment shown in FIG. 1. Examples of the material of the specular layer 14 include oxides such as Fe—O, Ni—O, Co—O, Co—Fe—O, Co—Fe—Ni—O, Al—O, Al-Q-O (wherein Q is at least one element selected from the group consisting of B, Si, N, Ti, V, Cr, Mn, Fe, Co, and Ni), R—O (wherein R is at least one element selected from the group consisting of Cu, Ti, V, Cr, Zr, Nb, Mo, Hf, Ta, and W); nitrides such as Al—N, Al-Q'-N (wherein Q' is at least one element selected from the group consisting of B, Si, O, Ti, V, Cr, Mn, Fe, Co, and Ni), and R'—N (wherein R is at least one element selected from the group consisting of Ti, V, Cr, Zr, Nb, Mo, Hf, Ta, and W); and metalloid Heusler alloys. For example, the specular layer 14 can be prepared by forming a Ta film approximately 30 Å in thickness on the free magnetic layer 13 and oxidizing the entire Ta film.

The specular layer 14 enhances specular scattering of spin-up conduction electrodes reaching the top face 13c of the free magnetic layer 13 and extends the spin diffusion length of the spin-up conduction electrons, i.e., the distance the spin-up conduction electrons can migrate without losing their spin. As a result, the mean free path of the spin-up conduction electrons can be increased, and the difference between the mean free path of the spin-up conduction electrons that contribute to the magnetoresistive effect and the mean free path of the spin-down conduction electrons can be made wider. Thus, the rate of change in resistance (ΔR/R) and the read output can be improved.

The specular layer 14 may be formed on the bottom face 13b of the free magnetic layer 13 only or on both the top face 13c and the bottom face 13b the free magnetic layer 13.

Figure 5:
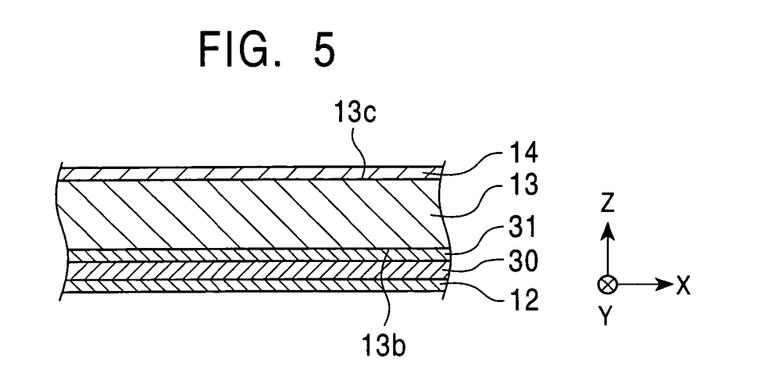
FIG. 5 is a partial enlarged cross-sectional view of another example of the free magnetic layer taken in a direction parallel to the opposing face.

FIG. 5 is a partial cross-sectional view of the free magnetic layer 13 viewed from the opposing face. The cross-section is taken in a direction parallel to the opposing face.

In FIG. 5, the specular layer 14 is formed on the top face 13c and another specular layer 31 is formed on the bottom face 13b of the free magnetic layer 13. In the structure shown in FIG. 5, a thin magnetic layer 30 is formed on the seed layer 12, the specular layer 31 is formed on the magnetic layer 30, and the free magnetic layer 13 is formed on the specular layer 31.

The magnetic layer 30 formed on the seed layer 12 has itself superior crystallinity and can improve the crystallinity of the free magnetic layer 13. The magnetic layer 30 and the free magnetic layer 13 must be magnetically continuous in order to achieve easy control of magnetic domains and to improve the crystallinity of the free magnetic layer 13. In this respect, the specular layer 31 between the magnetic layer 30 and the free magnetic layer 13 must be composed of an oxide or a nitride of a magnetic material and must have a significantly small thickness.

For example, a nanometer-order specular layer 31 can be prepared by oxidizing the surface of the magnetic layer 30 composed of a CoFe alloy. The specular layer 31 prepared as such is also referred to as the "nano oxide layer". The nanometer-order specular layer 31 has pinholes, and the magnetic layer 30 can be coupled with the free magnetic layer 13 through the specular layer 31. Thus, the magnetic layer 30 and the free magnetic layer 13 can function as an integral free magnetic layer.

Figure 6:
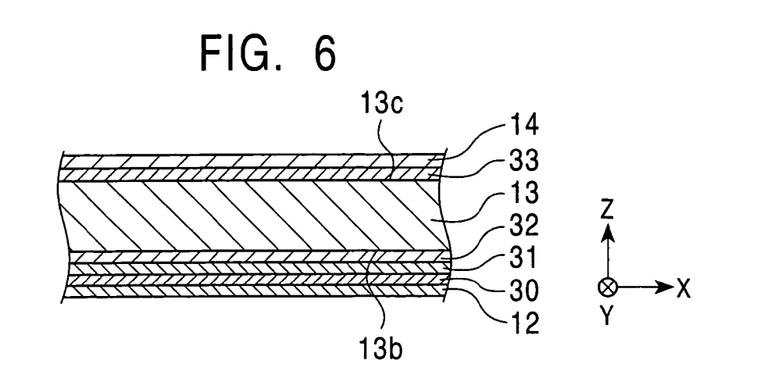
FIG. 6 is a partial cross-sectional plan view of yet another example of the free magnetic layer taken in a direction parallel to the opposing face.

FIG. 6 is a partial cross-sectional view of another structure of the free magnetic layer 13 viewed from the opposing face. The cross-section is taken in a direction parallel to the opposing face.

Unlike in FIG. 5, a backing layer 32 is disposed between the bottom face 13b of the free magnetic layer 13 and the specular layer 31, and a backing layer 33 is disposed between the top face 13c of the free magnetic layer 13 and the specular layer 14. The backing layers 32 and 33 are composed of Cu, Au, Cr, or Ru and extend the mean free path of, for example, the spin-up conduction electrodes due to the spin filter effect. Thus, a magnetic sensing element having a high rate of change in resistance and read output can be manufactured. In FIG. 6, the magnetic layer 30 may be replaced with a Cu layer, and the specular layer 31 may be prepared by oxidizing the surface of this Cu layer. The Cu layer also contributes to crystal growth.

The specular layer is preferably disposed under and/or inside the pinned magnetic layer 16 in order to improve the read output and the rate of change in resistance.

Figure 7:
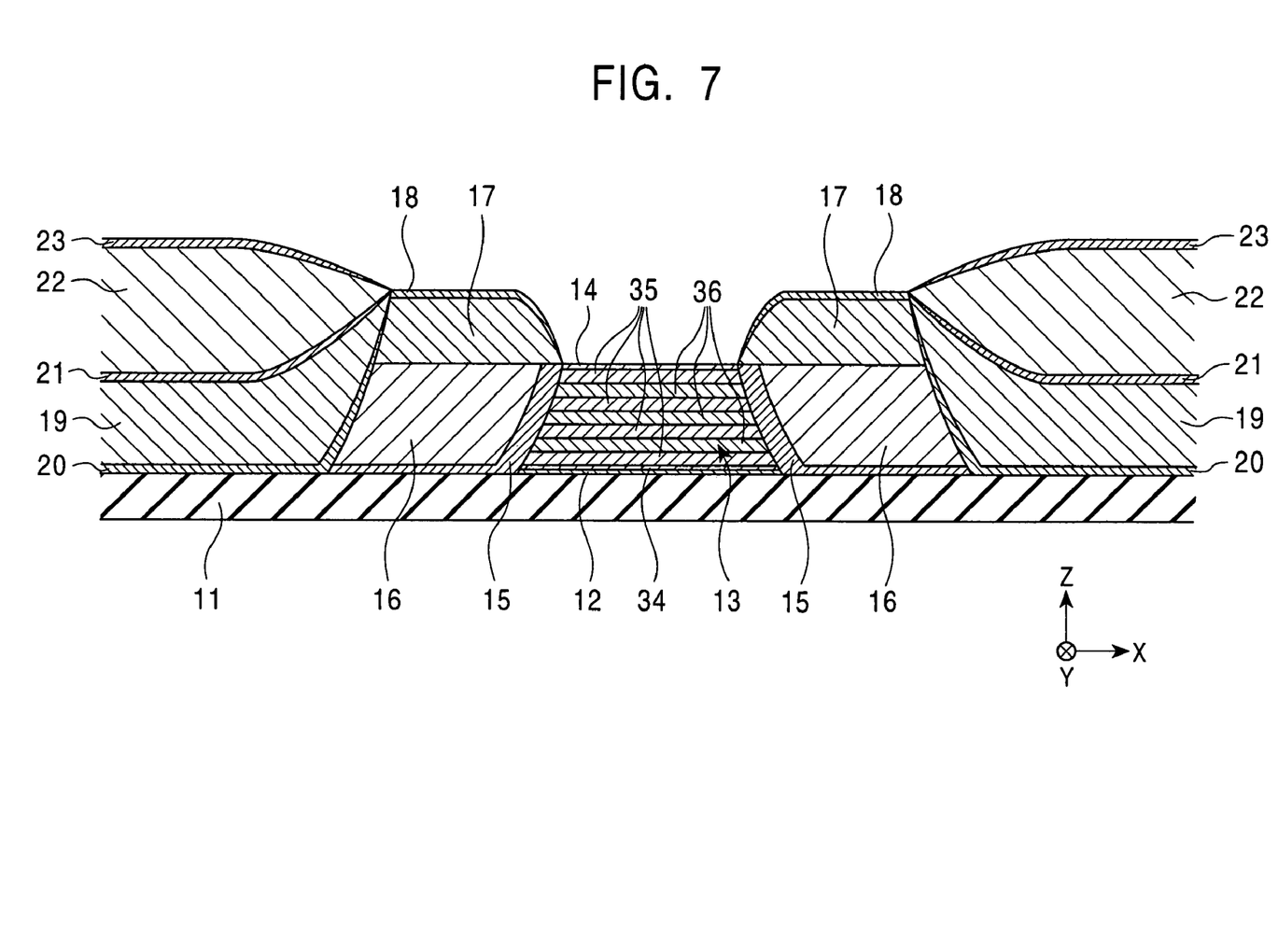
FIG. 7 is a cross-sectional view of another example magnetic sensing element taken in the direction parallel to the opposing face.

FIG. 7 is a partial cross-sectional view of an example magnetic sensing element taken in the direction parallel to the opposing face. The free magnetic layer 13 of the magnetic sensing element shown in FIG. 7 has an improved structure. In FIG. 7, the same components as in FIG. 1 are represented by the same reference numerals. The X-Y cross-section of the free magnetic layer 13, the nonmagnetic conductive layers 15, and the pinned magnetic layers 16 has a structure shown in one of FIGS. 2 to 4.

In FIG. 7, the free magnetic layer 13 is constituted from a plurality of magnetic sublayers 36 and a plurality of conductive nonmagnetic interlayers 35 alternately stacked on each other in the thickness direction (the Z direction). The magnetic sublayers 36 are all magnetized in the same direction.

The adjacent magnetic sublayers 36 separated by the nonmagnetic interlayers 35 are magnetized by ferromagnetic coupling (parallel coupling). The magnetic sublayers 36 function as an integral magnetic member, the magnetization direction of which is rotatable in response to external magnetic fields.

The ferromagnetic coupling is achieved through Ruderman-Kittel-Kasuya-Yosida (RKKY) ferromagnetic coupling, direct exchange coupling through pinholes in the nonmagnetic interlayers 35, and/or topological coupling or orange-peel coupling, i.e., magnetostatic coupling resulting from the interfacial roughness of the nonmagnetic interlayers 35.

In order to use the ferromagnetic coupling, the thickness of the nonmagnetic interlayers 35 is preferably controlled in the range of 1 to 6 Å. The thickness of each magnetic sublayer 36 is preferably about 10 about 50 Å.

In FIG. 7, the pinned magnetic layers 16 and the magnetic sublayers 36 of the free magnetic layer 13 are composed of a material such that the spin-dependant bulk scattering coefficient $\beta$ is positive (+). The nonmagnetic conductive layers 15 and the nonmagnetic interlayers 35 are composed of a material such that the spin-dependant interfacial scattering coefficients $\gamma$ between the pinned magnetic layers 16 and the nonmagnetic conductive layer 15, between the nonmagnetic conductive layers 15 and the free magnetic layer 13, and between the magnetic sublayers 36 and the nonmagnetic interlayers 35 are positive (+).

Examples of the material that can yield a positive spin-dependant bulk scattering coefficient $\beta$ include NiX alloy, a CoT alloy, an FeZ alloy, or a Co—Mn-D alloy, wherein X is at least one selected from the group consisting of Co, Fe, Mn, Zr, Hf, Cu, and Au, T is at least one selected from the group consisting of Fe, Zr, Ta, and Hf, Z is at least one selected from the group consisting of Ni, Co, Rh, Pt, Ir, Be, Al, Si, Ga, and Ge, and D is at least one selected from the group consisting of Al, Ga, Si, Ge, and Sn. One of these materials should be selected to form the pinned magnetic layers 16 and the magnetic sublayers 36 of the free magnetic layer 13. The material that can yield a positive spin-dependent interfacial scattering coefficient $\gamma$ is copper (Cu), for example.

The magnetic sensing element shown in FIG. 7 has the following advantages. First, since the free magnetic layer 13 has a multilayer structure including the magnetic sublayers 36 and the nonmagnetic interlayers 35, the volume ratio of the magnetic sublayers 36 in the free magnetic layer 13 can be decreased. As a result, the effective Ms·t can be decreased, and the read sensitivity can be improved.

Second, since the interfaces in which the spin filtering effect is generated increase, filtering out of spin-down conduction electrodes readily occurs, and the difference in the mean free path between the spin-up conduction electrons and the spin-down conduction electrons can be widened. As a result, the rate of change in resistance (ΔR/R) and the change in resistance (ΔR) can be increased, and the read output can be improved. These advantages will now be explained in detail with reference to FIG. 8.

Figure 8:
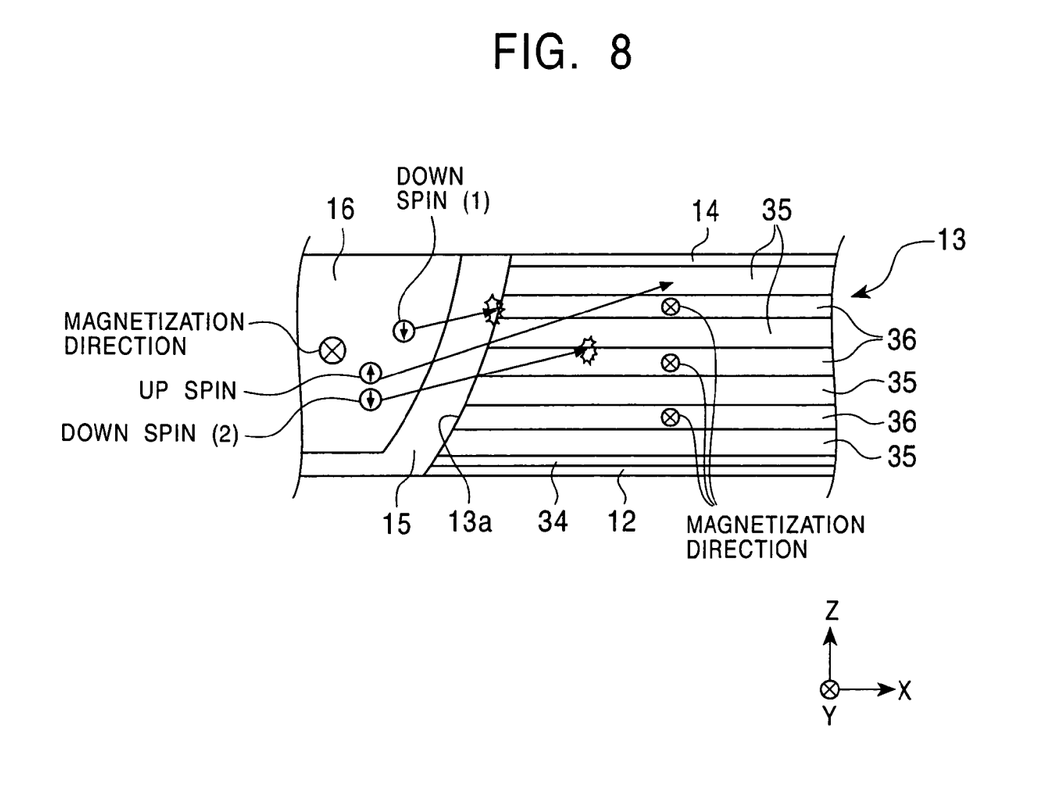
FIG. 8 is a partial enlarged schematic view of the free magnetic layer, the nonmagnetic conductive layers, and the pinned magnetic layers shown in FIG. 7.

FIG. 8 is a partial schematic view of the pinned magnetic layer 16, the nonmagnetic conductive layer 15, and the free magnetic layer 13 shown in FIG. 7. As shown in FIG. 8, the magnetization direction of the pinned magnetic layer 16 is pinned in the Y direction, and the magnetic sublayers 36 of the free magnetic layer 13 are magnetized in the Y direction in response to an external magnetic field. Here, the magnetic sublayers 36 of the free magnetic layer 13 and the pinned magnetic layer 16 are magnetized in the same direction.

As shown in FIG. 8, the spin-up conduction electrons pass through the pinned magnetic layer 16, the nonmagnetic conductive layer 15, and the magnetic sublayers 36 and the nonmagnetic interlayers 35 of the free magnetic layer 13. The spin-up conduction electrons are then specular reflected at the specular layer 14.

Spin-down conduction electrons are filtered out at the interface between the free magnetic layer 13 and the nonmagnetic conductive layer 15 as a result of the spin-filtering effect. Some spin-down conduction electrons that entered the free magnetic layer 13 without being filtered out at the interfaces between the free magnetic layer 13 and the nonmagnetic conductive layer 15 and between the pinned magnetic layer 16 and the nonmagnetic conductive layer 15 are filtered out at the interfaces between the nonmagnetic interlayers 35 and the magnetic sublayers 36 due to the spin filtering effect. As a result, the difference in mean free path between the spin-up conduction electrons and the spin-down conduction electrons becomes wider, thereby achieving improved resistance change characteristics.

In FIG. 8, the specular layer 14 is disposed on the top face 13c of the free magnetic layer 13 and a specular layer 34 is disposed on the bottom face 13b of the free magnetic layer 13. In this manner, the difference in the mean free path between the spin-up conduction electrons and the spin-down conduction electrons can be effectively widened.

Figure 9:
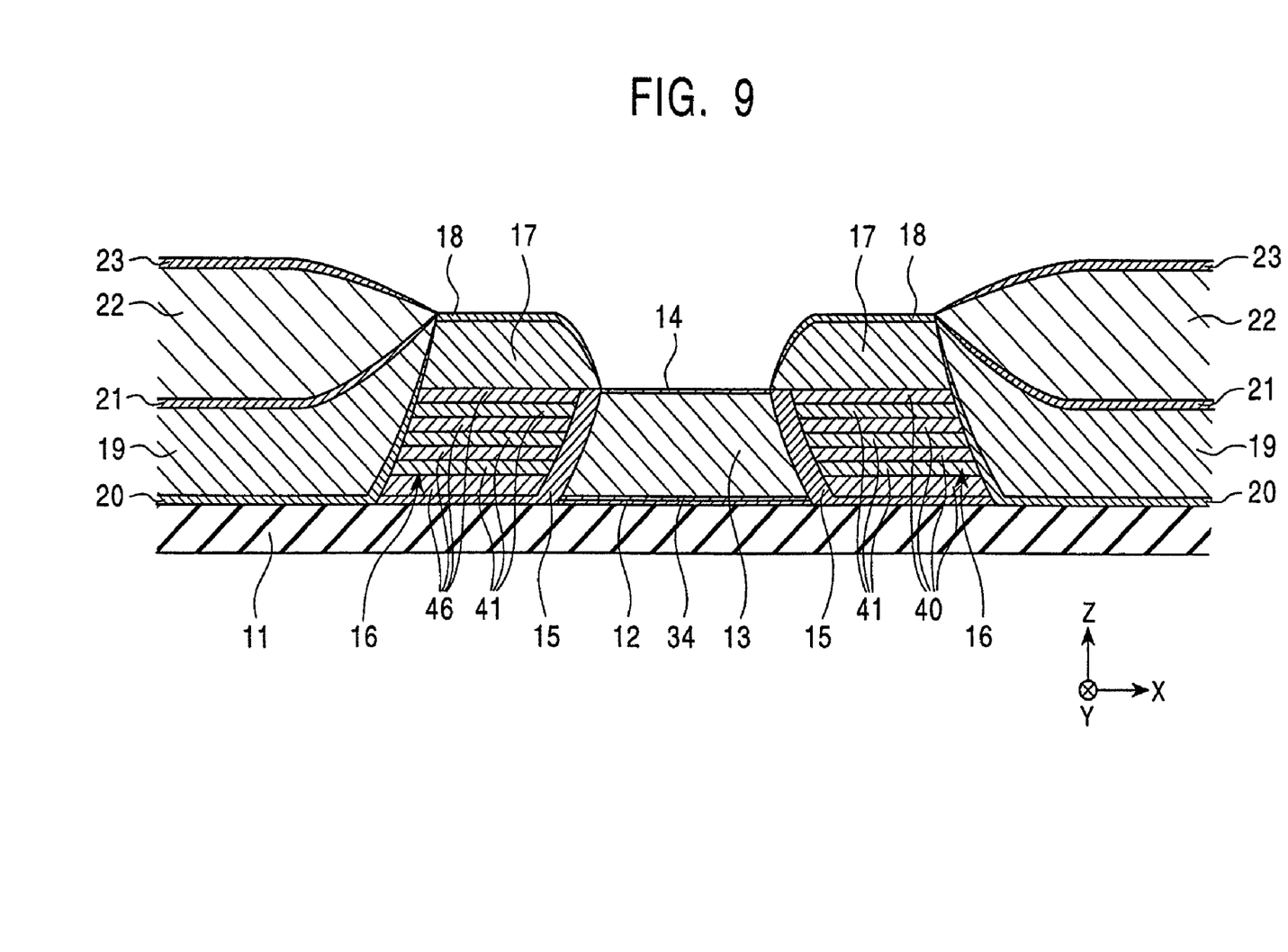
FIG. 9 is a cross-sectional view of another example magnetic sensing element taken in the direction parallel to the opposing face.

FIG. 9 is a partial cross-sectional view of the magnetic sensing element taken in a direction parallel to the opposing face. The same components as in FIG. 1 are represented by the same reference numerals. In the magnetic sensing element shown in FIG. 9, each pinned magnetic layer 16 has an improved structure. The X-Y cross-section of the free magnetic layer 13, the nonmagnetic conductive layers 15, and the pinned magnetic layers 16 has a structure shown in one of FIGS. 2 to 4.

In FIG. 9, each pinned magnetic layer 16 is constituted from a plurality of magnetic sublayers 40 and conductive nonmagnetic interlayers 41 alternately stacked on each other in the thickness direction (Z direction). The magnetization direction of all of the magnetic sublayers 40 is pinned in the same direction.

The adjacent magnetic sublayers 40 separated by the nonmagnetic interlayers 41 are magnetized as a result of ferromagnetic coupling (parallel coupling). The magnetization direction of the magnetic sublayers 40 is, for example, pinned in the height direction (Y direction). The types of the ferromagnetic coupling are the same as those described above.

In forming the magnetic sublayers 40 and the nonmagnetic interlayers 41 of the pinned magnetic layer 16, the thickness of the nonmagnetic interlayers 41 tends to gradually decrease toward the free magnetic layer 13, and fluctuation of the thickness of the nonmagnetic interlayers 41 is dramatically larger than that of the nonmagnetic interlayers 35 of the free magnetic layer 13 shown in FIG. 8. Thus, the deposition process must be stringently controlled so that the thickness of each nonmagnetic interlayer 41 is no more than 6 Å at the thickest portion. In this manner, the RKKY ferromagnetic coupling can be effectively utilized, and the magnetization of all of the magnetic sublayers 40 of the pinned magnetic layer 16 can be pinned in the same direction.

The magnetic sublayers 40 of the free magnetic layer 13 and the free magnetic layer 13 are composed of a material that can yield a positive spin-dependant bulk scattering coefficient β. The nonmagnetic conductive layers 15 and the nonmagnetic interlayers 41 of the pinned magnetic layer 16 are composed of a material that yields positive spin-dependent interfacial scattering coefficients γ at the interfaces between the pinned magnetic layers 16 and the nonmagnetic conductive layer 15, between the nonmagnetic conductive layers 15 and the free magnetic layer 13, and between the magnetic sublayers 40 and the nonmagnetic interlayers 41. Examples of these materials are the same as those described above.

The pinned magnetic layer 16 constituted from the magnetic sublayers 40 and the nonmagnetic interlayers 41 shown in FIG. 9 can achieve the following advantages.

First, as with the free magnetic layer 13, the diffusive scattering of spin-up conduction electrons at the top and bottom faces of the pinned magnetic layer 16 degrades the magnetoresistive characteristics. In this respect, the thickness of the pinned magnetic layer 16 should be large. However, when the thickness is excessively large, the exchange coupling magnetic field Hex between the pinned magnetic layer 16 and the first antiferromagnetic layer 17 decreases in inverse proportion to the thickness, thereby causing reliability problems such as electrostatic damage (ESD). When the pinned magnetic layer 16 is constituted from the magnetic sublayers 40 and the nonmagnetic interlayers 41, the thickness of the magnetic sublayers 40 that come into direct contact with the first antiferromagnetic layers 17 can be decreased, and Ms·t of the entire pinned magnetic layer 16 can be decreased. Thus, the exchange coupling magnetic field Hex can be increased, and the entire thickness of the pinned magnetic layer 16 can be increased. As a result, diffusive scattering of spin-up conduction electrons can be suppressed, and the magnetoresistive characteristics can be improved. Note that a specular layer (not shown) is preferably disposed under the pinned magnetic layer 16.

Second, as is described in regards with FIG. 7, the interfaces that generate the spin filtering effects are increased. Thus, spin-down conduction electrons can be readily filtered out. The difference in the mean free path between spin-up conduction electrons and spin-down conduction electrons can be widened, and the magnetoresistive characteristics can be improved.

Figure 10:
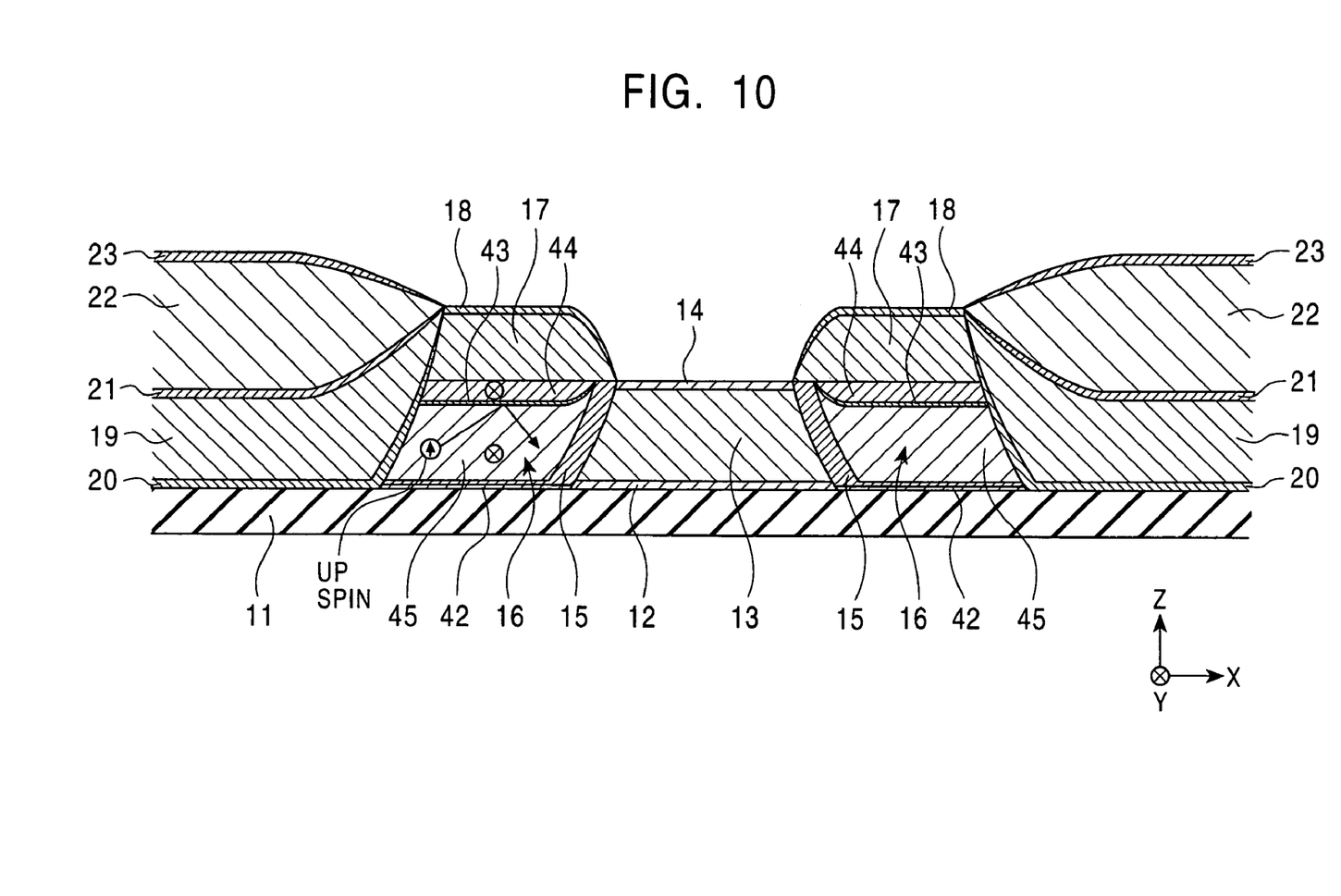
FIG. 10 is a cross-sectional view of still another example magnetic sensing element taken in the direction parallel to the opposing face.

FIG. 10 is a partial cross-sectional view of a magnetic sensing element taken in the direction parallel to the opposing face. The pinned magnetic layer 16 of the magnetic sensing element shown in FIG. 10 has a structure different from that shown in FIG. 9. The components same as those in FIG. 1 are represented by the same reference numerals. The X-Y cross-section of the free magnetic layer 13, the nonmagnetic conductive layers 15, and the pinned magnetic layers 16 has the same structure as shown in one of FIGS. 2 to 4.

In the structure shown in FIG. 10, each pinned magnetic layer 16 is constituted from a thick magnetic layer 45, a thin magnetic layer 44, and a specular layer 43 disposed between the thin magnetic layer 44 and the thick magnetic layer 45. The thin magnetic layer 44 is ferromagnetically coupled to the thick magnetic layer 45 via pinholes in the specular layer 43, and the magnetization directions of the thin magnetic layer 44 and the thick magnetic layer 45 are firmly pinned in the same direction (the height direction in FIG. 10) so that they can function as an integral pinned magnetic layer.

As shown in FIG. 10, the thin magnetic layer 44 in direct contact with the first antiferromagnetic layer 17 has a smaller thickness. In this manner, the intensity of the exchange coupling magnetic field Hex between the first antiferromagnetic layer 17 and the thin magnetic layer 44 can be increased. Moreover, since the specular layer 43 is disposed on the top of the thick magnetic layer 45, spin-up conduction electrons are specular reflected at the specular layer 43. Thus, the spin diffusion length of the spin-up conduction electrons can be extended, and the resistance change characteristics can be improved. Note that in this preferred example, a specular layer 42 is formed under the pinned magnetic layer 16.

In the structure of FIG. 10, each specular layer 43 between the thin magnetic layer 44 and the thick magnetic layer 45 is preferably a nano oxide layer described above. for example, the specular layer 43 having an extremely small thickness on the nanometer order can be prepared by forming the thick magnetic layer 45 with a CoFe alloy and oxidizing the surface of the thick magnetic layer 45. In this manner, the thin magnetic layer 44 and the thick magnetic layer 45 can function as one integral pinned magnetic layer.

Next, a structure for controlling the magnetization direction of the free magnetic layer 13 is explained. In FIGS. 1 to 10, the free magnetic layer 13 is magnetized in the track width direction (X direction) by a longitudinal bias magnetic field supplied from the hard bias layers 19.

In order to supply a longitudinal magnetic field of an appropriate intensity to the free magnetic layer 13, the width T4 in the track width direction taken at the middle of the thickness of the pinned magnetic layer 16 shown in FIG. 1 is preferably controlled in the range of 50 to 1,000 Å. In this manner, the longitudinal bias magnetic field can be supplied to the free magnetic layer 13 through the hard bias layers 19 and the pinned magnetic layers 16 without significant attenuation. Thus, the free magnetic layer 13 can be put to a single-magnetic-domain state in the track width direction.

In recent years, element size reduction is rapidly progressing with increasing recording density. The free magnetic layer 13 is preferably located a predetermined distance away from the hard bias layers 19 in order to supply a longitudinal magnetic field of an appropriate intensity to the free magnetic layer 13, as shown in FIG. 1. According to this structure, the magnetization direction of the free magnetic layer 13 can readily rotate in response with the external magnetic field medium magnetic field.

The magnetization direction of the free magnetic layer 13 may be controlled by using means other than the hard bias layers 19 shown in FIGS. 1 to 10. For example, an exchange-coupled film constituted from a magnetic layer and an antiferromagnetic layer may be formed above or under the free magnetic layer 13 with an insulating layer therebetween. In this manner, magnetostatic coupling occurs between ends of the free magnetic layer 13 and ends of the magnetic layer or the hard magnetic layer, and magnetostatic coupling can be used to control the magnetization direction of the free magnetic layer 13 (in-stack biasing method utilizing magnetostatic coupling). Alternatively, an antiferromagnetic layer may be formed above or under the free magnetic layer 13 with a nonmagnetic conductive layer therebetween. In this manner, a moderate degree of indirect exchange coupling occurs between the free magnetic layer 13 and the antiferromagnetic layer, thereby controlling the magnetization direction of the free magnetic layer 13 (in-stack biasing method utilizing exchange coupling). Alternatively, an exchange coupling film constituted from a magnetic layer and an antiferromagnetic layer may be disposed under or above the free magnetic layer 13 with a nonmagnetic layer composed of Ru or the like therebetween. In this manner, a moderate degree of antiparallel coupling (weak RKKY coupling) occurs between the magnetic layer and the free magnetic layer 13, and the magnetization direction of the free magnetic layer 13 can be controlled by the antiparallel coupling (in-stack biasing method using the RKKY effect). According to any one of these biasing methods, an antiferromagnetic layer or a hard magnetic layer is formed above or under the free magnetic layer 13. Thus, these methods are disadvantageous in that the gap length becomes larger that that of the structure using hard bias layers 19 at the two sides of the pinned magnetic layers 16. However, these methods are effective means for controlling the magnetization direction of the free magnetic layer 13.

In FIGS. 1 to 10, the pinned magnetic layers 16 are composed of a soft magnetic material such as a NiFe alloy or CoFe alloy, and the first antiferromagnetic layer 17 is formed on the top face of each pinned magnetic layer 16. The exchange coupling magnetic field generated between the pinned magnetic layer 16 and the first antiferromagnetic layer 17 is used to pin the magnetization direction of the pinned magnetic layer 16 in the height direction. Alternatively, the pinned magnetic layers 16 may be composed of a hard magnetic material.

Figure 11:
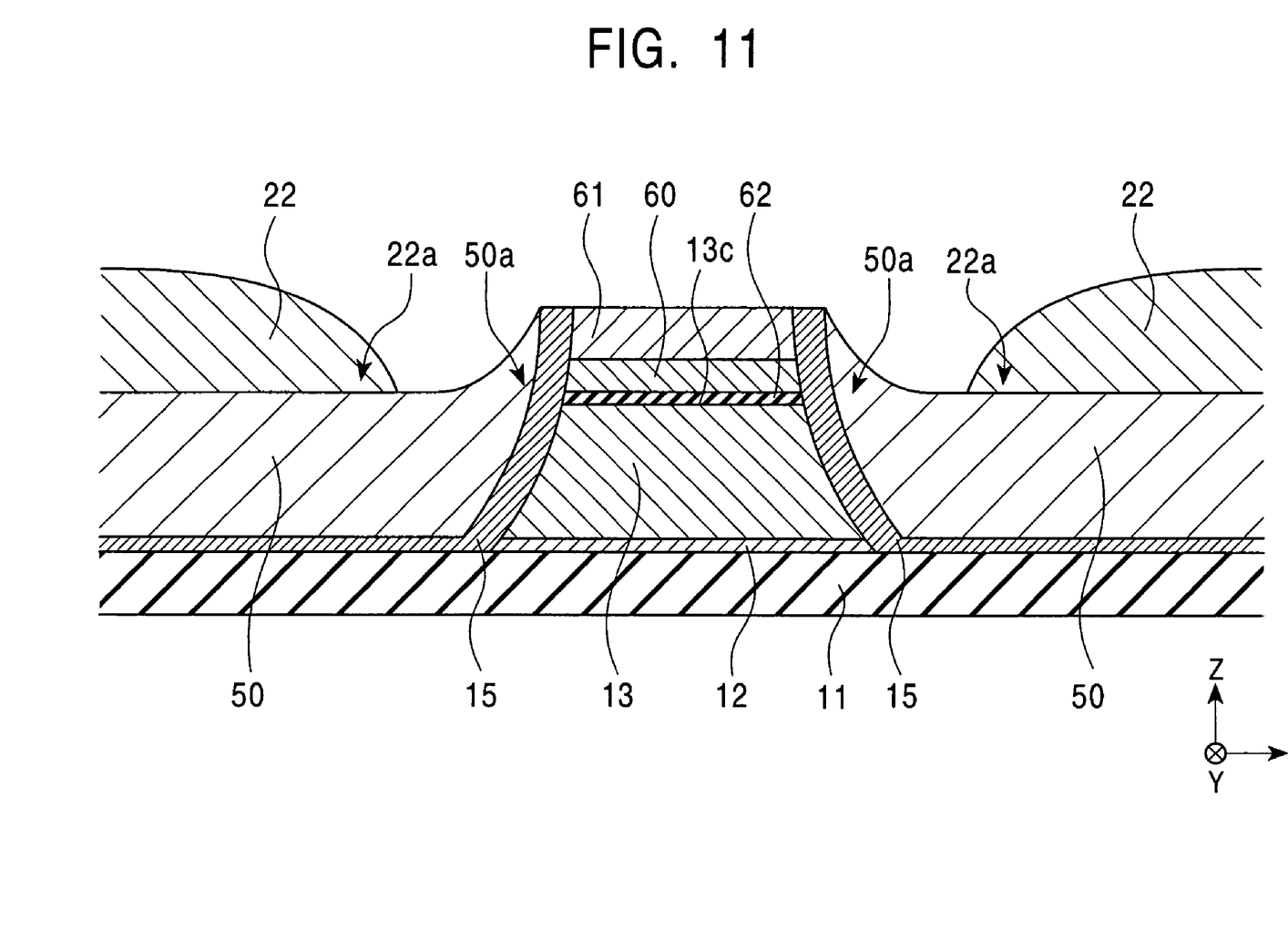
FIG. 11 is a cross-sectional view of yet another example magnetic sensing element taken in the direction parallel to the opposing face.

FIG. 11 is a partial cross-sectional view of a magnetic sensing element having pinned magnetic layers 50 composed of a hard magnetic material. The cross-section is taken in the direction parallel to the opposing face.

Since the pinned magnetic layers 50 are composed of a hard magnetic material, the hard bias layers 19 for controlling the magnetization direction of the free magnetic layer 13 cannot be formed on outer end faces of the pinned magnetic layers 50. This structure employs one of the above-described in-stack biasing methods in order to control the magnetization direction of the free magnetic layer 13.

In FIG. 11, an insulating layer 62 is formed on the top face 13c of the free magnetic layer 13, a ferromagnetic layer 60 is formed on the insulating layer 62, and an antiferromagnetic layer 61 (also referred to as the "second antiferromagnetic layer 61) is formed on the ferromagnetic layer 60. An exchange coupling magnetic field is generated between the second antiferromagnetic layer 61 and the ferromagnetic layer 60 to pin the magnetization direction of the ferromagnetic layer 60 in the track width direction. Magnetostatic coupling between ends of the free magnetic layer 13 in the track width direction (X direction) and ends of the ferromagnetic layer 60 in the track width direction orients the magnetization direction of the free magnetic layer 13 in the track width direction.

As shown in FIG. 11, the side faces of the layers from the seed layer 12 up to the second antiferromagnetic layer 61 form continuous curves. The pinned magnetic layers 50 composed of a hard magnetic material such as CoPt, alloy or a CoPtCr alloy are formed on the two sides of these layers with the nonmagnetic conductive layers 15 therebetween. The magnetization of the pinned magnetic layers 50 is pinned in the Y direction in the drawing through in-field deposition or polarizing treatment after completion of the manufacture of the head.

The structure shown in FIG. 11 can simplify the magnetization control of the pinned magnetic layers 50. Whereas the structure employing the hard bias layers 19 requires adjustment of the width of the pinned magnetic layers 16 in the track width direction in order to optimize the intensity of the longitudinal bias magnetic field and to allow the pinned magnetic layers 16 to sufficiently function, such adjustment is not necessary according to the structure shown in FIG. 11. The free magnetic layer 13 can be easily put to a single-magnetic-domain state merely by adjusting the thickness of the insulating layer 62 or the like.

Moreover, by arranging the inner tip 22a of each electrode layer 22 a particular distance away from an inner tip 50a of the pinned magnetic layer 50, shunt loss of sensing current supplied from the electrode layer 22 can be decreased, and a magnetic sensing element with large read outputs can be obtained.

Note that that the magnetic sensing elements of the present invention are applicable not only to the thin-film magnetic head installed in hard disk devices but also to tap magnetic heads and magnetic sensors.

The above-described embodiment and modifications are for the illustrative purpose only and do not limit the scope of the invention. Various other modifications are possible without departing from the scope of the present invention.

According to the present invention, a magnetic sensing element having a free magnetic layer, nonmagnetic conductive layers, and pinned magnetic layers that align in the track width direction can be manufactured. Electric current flows to the free magnetic layer through the pinned magnetic layers and the nonmagnetic conductive layers.

In particular, in a cross-section of the free magnetic layer, a back end of the free magnetic layer extends parallel to a track width direction. In a cross-section of the nonmagnetic conductive layers, back ends of the nonmagnetic conductive layers are coincident with an extension line drawn by extending the back end of the free magnetic layer. In a cross-section of the pinned magnetic layers, back ends of the pinned magnetic layers are at least partly coincident with the extension line. All the cross-sections are taken in a direction parallel to the surface of each respective layer. This structure can increase the current density in portions of the pinned magnetic layers near the free magnetic layer. Thus, a magnetic sensing element having a higher read output can be obtained.

A specular layer may be formed above or under the free magnetic layer, or specular layers may be formed above and under the free magnetic layer. Moreover, the free magnetic layer may have a multilayer structure including a plurality of magnetic sublayers and nonmagnetic interlayers. In this manner, the rate of change in resistance (ΔR/R) and the change in resistance ΔR can be increased. The read output can be improved as a result.

Furthermore, the invention establishes a means for controlling the magnetization direction of the free magnetic layer, i.e., putting the free magnetic layer in a single-magnetic-domain state. Thus, a magnetic sensing element compatible with higher recording density can be obtained.

What is claimed is:

1. A magnetic sensing element comprising a composite comprising:
    a lower gap layer;
    a free magnetic layer disposed over the lower gap layer;
    two nonmagnetic conductive layers disposed at two sides of the free magnetic layer, each of the two nonmagnetic conductive layers being composed of a nonmagnetic conductive material;
    two pinned magnetic layers disposed at the two sides of the free magnetic layer with the nonmagnetic conductive layers therebetween;
    two antiferromagnetic layers disposed on the pinned magnetic layer;
    two hard bias layers disposed at the two sides of the free magnetic layer with the nonmagnetic conductive layers and the pinned magnetic layers therebetween;
    a first specular layer disposed on a top face of the free magnetic layer;
    a second specular layer disposed on a bottom face of the free magnetic layer:
    a thin magnetic layer disposed on a bottom face of the second specular layer: and
    a seed layer disposed on a bottom face of the thin magnetic layer;
    wherein the thickness of the second specular layer is on the nanometer order and the thin magnetic layer is directly connected to the free magnetic via pinholes in the second specular layer;
    wherein each of the pinned magnetic layers comprises a third specular layer formed between a first magnetic layer and a second magnetic layer, the thickness of the first magnetic layer being smaller than the thickness of the second magnetic layer, the antiferromagnetic layers formed in contact with the first magnetic layer and the thickness of the third specular layer is on the nanometer order and the first magnetic layer is directly connected to the second magnetic layer via pinholes in the third specular layer; and
    a fourth specular layer disposed on a bottom face of each of the pinned magnetic layers;
    wherein an electric current flows through the free magnetic layer via the pinned magnetic layers and the nonmagnetic conductive layers,
    wherein, in a cross-section of the free magnetic layer, the nonmagnetic conductive layers, and the pinned magnetic layers, the cross-section being taken in a direction parallel to a surface of each layer, a back end of the free magnetic layer extends parallel to a track width direction, back ends of the nonmagnetic conductive layers are coincident with an extension line drawn by extending the back end of the free magnetic layer, and back ends of the pinned magnetic layers are at least partly coincident with the extension line, and
    wherein the two nonmagnetic conductive layers each have a first portion disposed between the free magnetic layer and the respective pinned magnetic layer and a second portion, which is continuous from the first portion, does not overlap the free magnetic layer, and is disposed between the lower gap layer and the pinned magnetic layer, the thickness of the second portion being smaller than the thickness of the first portion,
    wherein, in the cross-section, the back end of each pinned magnetic layer has a first portion coincident with the extension line and a second portion that extends in a height direction from the extension line,
    wherein a length of each pinned magnetic layer from a face opposing a recording medium to the back end in the height direction is smaller in a region near the nonmagnetic conductive layers and the free magnetic layer,
    wherein the back ends of the nonmagnetic conductive layers are disposed between the back end of the free magnetic layer and the back end of the first portion of the pinned magnetic layer, and
    wherein the back end of the free magnetic layer, the back ends of the nonmagnetic conductive layers, and the back ends of the first portions of the pinned magnetic layers form a plane.

2. The magnetic sensing element according to claim 1, further comprising at least one backing layer disposed between the free magnetic layer and said at least one specular layer selected from the group consisting of the first specular layer and the second specular layer.

3. The magnetic sensing element according to claim 1, wherein the free magnetic layer comprises a plurality of magnetic sublayers and conductive nonmagnetic interlayers alternately stacked on each other, and magnetization directions of all of the magnetic sublayers are oriented in the same direction.

4. The magnetic sensing element according to claim 3, wherein the pinned magnetic layers and the plurality of magnetic sublayers of the free magnetic layer comprise a material that yields a positive spin-dependant bulk scattering coefficient $\beta$, and the nonmagnetic conductive layers and the nonmagnetic interlayers comprise a material that yields positive spin-dependent interfacial scattering coefficients $\gamma$ at interfaces between the pinned magnetic layers and the nonmagnetic conductive layers, between the nonmagnetic conductive layers and the free magnetic layer, and between the magnetic sublayers and the conductive nonmagnetic interlayers.

5. The magnetic sensing element according to claim 4, wherein the material that yields a positive spin-dependant bulk scattering coefficient $\beta$ comprises one of a NiX alloy, a CoT alloy, an FeZ alloy, and a Co—Mn-D alloy, wherein X is at least one selected from the group consisting of Co, Fe, Mn, Zr, Hf, Cu, and Au, T is at least one selected from the group consisting of Fe, Zr, Ta, and Hf, Z is at least one selected from the group consisting of Ni, Co, Rh, Pt, Ir, Be, Al, Si, Ga, and Ge, and D is at least one selected from the group consisting of Al, Ga, Si, Ge, and Sn; and wherein the material that yields positive spin-dependent interfacial scattering coefficients $\gamma$ comprises Cu.

6. The magnetic sensing element according to claim 1, wherein each pinned magnetic layer comprises a plurality of magnetic sublayers and conductive nonmagnetic interlayers alternately stacked on each other, and magnetization directions of all of the magnetic sublayers are pinned in the same direction.

7. The magnetic sensing element according to claim 6, wherein the plurality of magnetic sublayers of the each pinned magnetic layer and the free magnetic layer comprise a material that yields a positive spin-dependant bulk scattering coefficient $\beta$, and the nonmagnetic conductive layers and the nonmagnetic interlayers comprise a material that yields positive spin-dependent interfacial scattering coefficients $\gamma$ at interfaces between the pinned magnetic layers and the nonmagnetic conductive layers, between the nonmagnetic conductive layers and the free magnetic layer, and between the magnetic sublayers and the conductive nonmagnetic interlayers.

8. The magnetic sensing element according to claim 1, wherein the nonmagnetic conductive material is copper.

9. The magnetic sensing element according to claim 1, wherein the first specular layer is a tantalum oxide layer.

10. The magnetic sensing element according to claim 1, wherein at least one of the second specular layer and the third specular layer is an oxide layer of a magnetic material or a nitride layer of a magnetic material.

11. The magnetic sensing element according to claim 1, wherein an electrode layer is disposed on each of the hard bias layers, and the distance between inner tips of two electrode layers is larger than the distance between inner tips of two antiferromagnetic layers.

12. The magnetic sensing element according to claim 1, wherein the distance between the free magnetic layer and each of the hard bias layers is in the range of 50 to 1,000 Å.

13. A magnetic sensing element comprising a composite comprising:

a lower gap layer;

a free magnetic layer disposed over the lower gap layer;

two nonmagnetic conductive layers disposed at two sides of the free magnetic layer, each of the two nonmagnetic conductive layers being composed of a nonmagnetic conductive material;

two pinned magnetic layers disposed at the two sides of the free magnetic layer with the nonmagnetic conductive layers therebetween;

two antiferromagnetic layers disposed on the pinned magnetic layers;

two hard bias layers disposed at the two sides of the free magnetic layer with the nonmagnetic conductive layers and the pinned magnetic layers therebetween;

a first specular layer disposed on a top face of the free magnetic layer;

a second specular layer disposed on a bottom face of the free magnetic layer;

a thin magnetic layer disposed on a bottom face of the second specular layer; and a seed layer disposed on a bottom face of the thin magnetic layer;

wherein the thickness of the second specular layer is on the nanometer order and the thin magnetic layer is directly connected to the free magnetic via pinholes in the second specular layer;

wherein each of the pinned magnetic layers comprises a third specular layer formed between a first magnetic layer and a second magnetic layer, the thickness of the first magnetic layer being smaller than the thickness of the second magnetic layer, the antiferromagnetic layers formed in contact with the first magnetic layer and the thickness of the third specular layer is on the nanometer order and the first magnetic layer is directly connected to the second magnetic layer via pinholes in the third specular layer;

wherein an electric current flows through the free magnetic layer via the pinned magnetic layers and the nonmagnetic conductive layers, wherein, in a cross-section of the free magnetic layer, the nonmagnetic conductive layers, and the pinned magnetic layers, the cross-section being taken in a direction parallel to a surface of each layer, a back end of the free magnetic layer, back ends of the nonmagnetic conductive layers, and back ends of the pinned magnetic layers form a continuous curve gradually receding in a height direction, and a length of each pinned magnetic layer from a face opposing a recording medium to the back end in the height direction is gradually reduced toward the free magnetic layer, wherein the two nonmagnetic conductive layers each have a first portion disposed between the free magnetic layer and the pinned magnetic layer and a second portion which is continuous from the first portion, does not overlap the free magnetic layer, and is disposed between the lower gap layer and the pinned magnetic layer, the thickness of the second portion being smaller than the thickness of the first portion wherein the back ends of the nonmagnetic conductive layers are disposed between the back end of the free magnetic layer and the back end of the pinned magnetic layer, and wherein the back end of the free magnetic layer, the back ends of the nonmagnetic conductive layers, and the back ends of the first portions of the pinned magnetic layers form a plane.

14. A magnetic sensing element comprising a composite comprising:

a lower gap layer;

a free magnetic layer disposed over the lower gap layer;

two nonmagnetic conductive layers disposed at two sides of the free magnetic layer, each of the two nonmagnetic conductive layers being composed of a nonmagnetic conductive material;

two pinned magnetic layers disposed at the two sides of the free magnetic layer with the nonmagnetic conductive layers therebetween;

two antiferromagnetic layers disposed on the pinned magnetic layers;

two hard bias layers disposed at the two sides of the free magnetic layer with the nonmagnetic conductive layers and the pinned magnetic layers therebetween;

a first specular layer disposed on a top face of the free magnetic layer;

a second specular layer disposed on a bottom face of the free magnetic layer;

a thin magnetic layer disposed on a bottom face of the second specular layer; and a seed layer disposed on a bottom face of the thin magnetic layer;

wherein the thickness of the second specular layer is on the nanometer order and the thin magnetic layer is directly connected to the free magnetic via pinholes in the second specular layer;

wherein each of the pinned magnetic layers comprises a third specular layer formed between a first magnetic layer and a second magnetic layer, the thickness of the first magnetic layer being smaller than the thickness of the second magnetic layer, the antiferromagnetic layers formed in contact with the first magnetic layer and the thickness of the third specular layer is on the nanometer order and the first magnetic layer is directly connected to the second magnetic layer via pinholes in the third specular layer;

wherein an electric current flows through the free magnetic layer via the pinned magnetic layers and the nonmagnetic conductive layers, wherein, in a cross-section of the free magnetic layer, the nonmagnetic conductive layers, and the pinned magnetic layers, the cross-section being taken in a direction parallel to a surface of each layer, a back end of the free magnetic layer, a back end of the nonmagnetic conductive layers, and a back end of a first portion of the pinned magnetic layers form a plane.

15. The magnetic sensing element according to claim 14, wherein the first portion of the pinned magnetic layers includes a width that is the same as widths of the free magnetic layer and the nonmagnetic conductive layers.

* * * * *